United States Patent [19]

Sawada

[11] Patent Number: 6,121,345
[45] Date of Patent: Sep. 19, 2000

[54] HOT-MELT INK

[75] Inventor: Hidemasa Sawada, Ama-gun, Japan

[73] Assignee: Brother Kogyo Kabushiki Kaisha, Nagoya, Japan

[21] Appl. No.: 09/081,105

[22] Filed: May 19, 1998

[30] Foreign Application Priority Data

May 23, 1997 [JP] Japan .................................. 9-150427

[51] Int. Cl.$^7$ ........................... C09D 11/02; C09D 11/10; C09D 177/00

[52] U.S. Cl. ....................... 523/160; 106/31.29; 106/31.6

[58] Field of Search ..................... 523/160, 161; 106/31.29, 31.3, 31.31, 31.34, 31.35, 31.61, 31.62, 31.63, 31.67

[56] References Cited

U.S. PATENT DOCUMENTS

| | | |
|---|---|---|
| 3,653,932 | 4/1972 | Berry et al. . |
| 4,390,369 | 6/1983 | Merritt et al. . |
| 4,659,383 | 4/1987 | Lin et al. . |
| 4,758,276 | 7/1988 | Lin et al. . |
| 4,820,346 | 4/1989 | Nowak . |
| 5,000,786 | 3/1991 | Matsuzaki . |
| 5,124,719 | 6/1992 | Matsuzaki . |
| 5,194,638 | 3/1993 | Frihart et al. .............................. 554/47 |
| 5,236,996 | 8/1993 | Smith ....................................... 524/608 |
| 5,350,789 | 9/1994 | Sagawa et al. .......................... 524/313 |
| 5,397,388 | 3/1995 | Fujioka ................................. 106/31.29 |
| 5,409,530 | 4/1995 | Kanbayashi et al. ................ 106/31.29 |
| 5,455,326 | 10/1995 | Parker . |
| 5,514,209 | 5/1996 | Larson, Jr. ............................. 106/31.3 |

FOREIGN PATENT DOCUMENTS

| | | |
|---|---|---|
| 0 510 460 A2 | 10/1992 | European Pat. Off. . |
| 0 610 090 A1 | 8/1994 | European Pat. Off. . |
| 0 739 958 A2 | 10/1996 | European Pat. Off. . |
| 58-108271 | 6/1983 | Japan . |
| 59-22973 | 2/1984 | Japan . |
| 61-83268 | 4/1986 | Japan . |
| 62-48774 | 3/1987 | Japan . |
| 62-295973 | 12/1987 | Japan . |
| 2-29471 | 1/1990 | Japan . |
| 2-167373 | 6/1990 | Japan . |
| WO 96/28305 | 9/1996 | WIPO . |

*Primary Examiner*—Vasu Jagannathan
*Assistant Examiner*—Callie E. Shosho
*Attorney, Agent, or Firm*—Oliff & Berridge, PLC

[57] ABSTRACT

A hot-melt ink exhibiting good thermal storage properties comprises an amide resin having an amine value of 2 or less. The amide resin has preferably an acid value of 2 or greater.

24 Claims, No Drawings

HOT-MELT INK

BACKGROUND OF THE INVENTION

1. Field of the Invention

The present invention relates to a hot-melt ink for use in ink-jet recording systems.

2. Related Art of the Invention

Ink-jet recording systems include electric field-controlled systems wherein electrostatic attraction is employed for ink ejection; drop-on-demand systems (pressure pulse systems) wherein the vibrational pressure provided by piezo elements is employed for ink ejection; and thermal ink-jet recording systems wherein the pressure produced by bubbles formed and expanded using high heat is employed for ink ejection. These systems all afford printed images of high detail.

The inks employed in such ink-jet recording systems are ordinarily water-based inks, in which water is the principal solvent, and oil-based inks, in which an organic solvent is the principal solvent. Images printed using water-based inks on the whole have inferior water resistance; in contrast, using oil-based inks it is possible to produce printed images exhibiting excellent water resistance.

since these water-based inks and oil-based inks are liquid at room temperature, feathering tends to occur when images are printed onto recording paper by use of these inks, and an adequate print density can not be obtained. Because these inks are liquids, they tend to cause the formation of deposits from the inks, whereby the reliability of ink jet recording systems becomes degraded.

Hot-melt inks, which are solid at ambient temperature, have been proposed as a means for overcoming the drawbacks of the inks pertaining to the prior art, which are liquid at room temperature. U.S. Pat. No. 3,653,932 teaches an ink containing a dialkyl ester of sebacic acid. U.S. Pat. No. 4,390,369 and Japanese Patent Application Laid-Open No. 58-108271 teach inks containing natural waxes. Japanese Patent Application Laid-Open No. 59-22973 teaches an ink containing stearic acid, while Japanese Patent Application Laid-Open No. 61-83268 teaches an ink containing an acid or alcohol with 20 to 24 carbon atoms and a ketone having a relatively high melting point. Japanese Patent Application Laid-Open No. 62-48774 teaches an ink containing a thermosetting resin that has a high hydroxyl value, a solid organic solvent with a melting point above 150° C., and a small quantity of dyestuff. Japanese Patent Application Laid-Open No. 2-167373 teaches an ink containing coloring matter, a first solvent that is solid at room temperature and that liquefies when heated to a temperature above room temperature, and a second solvent that dissolves the first solvent and that is a highly volatile liquid at room temperature. Japanese Patent Application Laid-Open No. 62-295973 teaches an ink containing a synthetic wax that has polar groups and a dye which is soluble in this synthetic wax. Japanese Patent Application Laid-Open No. 2-29471 teaches an ink containing ketones, amide waxes, waxes, and coloring matter.

These hot-melt inks, however, have poor thermal storage properties. In ink-jet printing systems, the ink held in the ink reservoir, print head, and other components is kept in a heated, melted state. If thermal storage properties are poor, the problem of ink discoloration prior to actual printing may arise.

SUMMARY OF THE INVENTION

The present invention was developed in order to overcome the aforementioned problems, and has as an object to provide a hot-melt ink that exhibits excellent thermal storage properties.

According to the present invention to accomplish the aforementioned object, there is provided a hot-melt ink comprising an amide resin, wherein the amide resin has an amine value of 2 or less.

This and other objects, features and advantages of the present invention are described in or will become apparent from the following detailed description of the invention.

DETAILED DESCRIPTION OF THE INVENTION

The hot-melt ink of the present invention comprises an amide resin, and is characterized in that the amide resin has an amine value of 2 or less. Where the amine value exceeds 2, the ink will lack adequate thermal storage properties; accordingly, the aforementioned range is stipulated. A value of 0.5 to 1 is preferred.

The aforementioned amine value can be determined as follows. A neutral mixed solvent is added to the amide resin, heated and dissolved over a hot water bath, and then cooled to room temperature. Using bromophenol blue as the indicator, titration is conducted with an N/10 HCl methanol solution, designating the point at which the blue color changes to a yellow color as the end point. The value is then computed using the following equation.

$$\text{AMINE VALUE} = (\text{N}/10\ \text{HCl}-\text{CH}_3\text{OH sol.(mL)} \times \text{normality} \times f \times 56.1)/\text{amide resin}(g)$$

In the equation, f is a factor of the N/10 HCl methanol solution.

The aforementioned amide resin preferably has an acid value of 2 or more. Where the acid value is less than 2, the ink will lack adequate thermal storage properties. A value of 3 to 12 lower is preferred.

The aforementioned acid value can be determined as follows. A neutral mixed solvent is added to the amide resin, heated and dissolved over a hot water bath, and then cooled to room temperature. Using phenolphthalein as the indicator, titration is conducted with an N/10 KOH methanol solution, designating the point at which a faint red color persists for 30 seconds as the end point. The value is then computed using the following equation.

$$\text{AMINE VALUE} = (\text{N}/10\ \text{KOH}-\text{CH}_3\text{OH sol.(mL)} \times \text{normality} \times f \times 56.1)/\text{amide resin}(g)$$

In the equation, f is a factor of the N/10 KOH methanol solution.

The aforementioned amide resin may be prepared by copolymerizing a bisamide with a dimer acid, for example. There are no particular restrictions regarding the bisamide; examples are azelamide, sebacamide, phthalamide, and the like.

The aforementioned dimer acid is a dicarboxylic acid obtained by thermal polymerization of two unsaturated aliphatic monocarboxylic acid molecules, such as vegetable-derived unsaturated fatty acids containing double bonds, or the like. There are no particular restrictions regarding the dimer acid; examples of the dimer acid include a dimer obtained by dimerization of two-oleic acid molecules, two linoleic acid molecules, two linolenic acid molecules, and the like.

The amine value and acid value of the amide resin prepared by copolymerization of a bisamide and a dimer acid will depend upon the amount of residual bisamide and the amount of residual dimer acid present in the amide resin. A large amount of residual bisamide is associated with a high amine value, while a small amount of residual bisamide and a large amount of residual dimer acid are associated with a high acid value.

There are no particular restrictions regarding the method employed for copolymerization of the aforementioned dimer acid and bisamide; any of the methods known in the prior art may be employed. The amine value and acid value of the amide resin can be controlled by manipulating the mixture ratio of the dimer acid and the bisamide during copolymerization. Specifically, an excess of the aforementioned bisamide can be combined with the dimer acid to increase the amount of residual bisamide in the resultant amide resin, thereby bringing the amine value and acid value of the aforementioned amide resin to within the range stipulated above.

As the amide resin, BIRTHAMIDE 335 and 725 (manufactured by Henkel-Hakusui Corporation), TOHMIDE 90 and 92 (manufactured by Fuji Kasei Kogyo Co., Ltd.), SUNMIDE 550 and 55 (manufactured by Sanwa Kagaku Kogyo K.K.), and other commercially available products may be used. These may be used individually or in combinations of two or more.

There are no particular restrictions regarding the additional components besides the amide resin contained in the hot-melt ink of the present invention. A favorable composition contains an amide resin, a terpene phenol resin, a ketone wax, a monoamide wax, an antioxidant, and coloring matter.

The preferred range for the aforementioned amide resin content is 1 to 35 wt % based on the resultant hot-melt ink. Below 1 wt %, the effect in terms of preventing crystallization of the wax, regulating the viscosity of the ink, improving ink transparency and adhesion, and the like is not adequately realized. Above 35 wt %, the ink develops a high melt viscosity, making it difficult to achieve satisfactory ink projection at the operating temperatures of printer heads employed in ink-jet recording systems. The more preferred range is 5 to 30 wt %.

The aforementioned terpene phenol resin has the effect of improving adhesion of the ink to the recording paper.

The preferred range for the aforementioned terpene phenol resin content is 0.1 to 15 wt % based on the resultant hot-melt ink. Below 0.1 wt %, there is minimal effect in terms of improving adhesion of the ink to the recording paper; above 15 wt %, the tackiness of the ink subsequent to printing becomes unnecessarily good, with the result that ink is offset to other sheets when paper printed is stacked together. The more preferred range is 0.5 to 10 wt %.

The aforementioned ketone wax lowers the melt viscosity of the ink more effectively than do other types of waxes. Accordingly, it becomes possible to increase the aforementioned amide resin content of the hot-melt ink which pertains to the present invention, thereby allowing the effects of the present invention to be more readily manifested.

There are no particular restrictions regarding the aforementioned ketone wax. Examples of the ketone wax include stearones such as T-1 (manufactured by Kao Corporation), and laurones such as LAURONE (manufactured by Kanto Kagaku Co., Ltd.). These may be used individually or in combinations of two or more.

The preferred range for the aforementioned ketone wax content is 1 to 70 wt % based on the resultant hot-melt ink. Below 1 wt %, it becomes difficult to achieve sharp thermal characteristics, and the ink develops a high melt viscosity, making it difficult to achieve satisfactory ink projection at the operating temperatures of printer heads employed in ink-jet recording systems. Above 70 wt %, the ink exhibits low melt viscosity, with the result that satisfactory printing is not possible. The more preferred range is 10 to 60 wt %.

The aforementioned monoamide wax has the effect of improving the solubility of the coloring matter contained in the ink.

There are no particular restrictions regarding the aforementioned monoamide wax. Examples of the monoamide wax include lauric acid amide, stearic acid amide, stearyl stearic acid amide, oleic acid amide, erucic acid amide, ricinoleic acid amide, 12-hydroxystearic acid amide, special fatty acid amides, N-substituted fatty acid amides, and the like. Specific examples thereof are NIKKAMIDE S, NIKKAMIDE SE, SLIPACKS (manufactured by Nihon Kasei Chemical Co., Ltd.), and the like. These may be used individually or in combinations of two or more.

The preferred range for the aforementioned monoamide wax content is 0.5 to 40 wt % based on the resultant hot-melt ink. Below 0.5 wt %, there is no improvement in the solubility of the coloring matter; above 40 wt %, the ink develops an unpleasant smell, and the melting point is elevated, making satisfactory printing impossible. The more preferred range is 5 to 30 wt %.

There are no particular restrictions regarding the antioxidant; examples are Irganox 1010 (manufactured by Ciba-Geigy Corporation) and the like.

The preferred range for the aforementioned antioxidant content is 0.1 to 5 wt % based on the resultant hot-melt ink. Below 0.1 wt %, adequate effect in preventing oxidation of the ink is not achieved; with amounts exceeding 5 wt %, the high melting point can alter the thermal properties of the ink, or give the printed ink surface the appearance of being dusted with white powder, adversely affecting color. The more preferred range is 0.5 to 3 wt %.

There are no particular restrictions regarding the coloring matter, with the proviso that it is a pigment or dye used in oil-based ink compositions of the prior art.

There are no particular restrictions regarding the aforementioned pigments. Any of the pigments commonly used in the field of printing, either organic or inorganic, may be employed. Examples of the pigments include carbon black, cadmium red, molybdenum red, chrome yellow, cadmium yellow, titan yellow, chromium oxide, viridian, titan cobalt green, ultramarine blue, Prussian blue, cobalt blue, azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments, and the like. These may be used individually or in combinations of two or more.

There are no particular restrictions regarding the aforementioned dyes. Examples of the dyes include azo dyes, disazo dyes, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, metal phthalocyanine dyes, and other oil-soluble dyes. These may be used individually or in combinations of two or more. They may also be used in conjunction with the pigments listed above.

The amount of color matter may be selected as appropriate with reference to the type of solvent component used, the properties required of the ink, and other factors; generally, 0.1 to 15 wt % based on the resultant hot-melt ink is preferred. Below 0.1 wt %, adequate print density is not obtained; above 15 wt %, the degree of freedom in selecting a matching solvent component tends to be reduced. The more preferred range is 0.5 to 10 wt %, and especially 1 to 5 wt %.

The hot-melt ink of the present invention may additionally contain other common additives used in hot-melt inks, such as waxes, ultraviolet absorbers, and the like.

There are no particular restrictions regarding the aforementioned wax. Examples of the wax include paraffin wax, microcrystalline wax, and other petroleum waxes; candelilla wax, carnauba wax, rice wax, solid jojoba wax, and other vegetable-derived waxes; beeswax, lanolin, spermaceti wax, and other animal-derived waxes; montan wax and other mineral waxes; Fischer-Tropsch wax, polyethylene wax, and other synthetic hydrocarbon waxes; hardened castor oil, hardened castor oil derivatives, and other hydrogenated waxes; montan wax derivatives, polyethylene wax derivatives, and other modified waxes; behenic acid, stearic acid, palmitic acid, myristic acid, lauric acid, and other higher fatty acids; stearyl alcohol, behenyl alcohol, and other higher alcohols; 12-hydroxystearic acid, 12-hydroxystearic acid derivatives, and other hydroxystearic acids; dodecylamine, tetradecylamine, octadecylamine, and other amines; methyl stearate, octadecyl stearate, glycerol fatty acid esters, sorbitan fatty acid esters, propylene glycol fatty acid esters, ethylene glycol fatty acid esters, polyoxyethylene fatty acid esters, and other esters; and α-olefin-maleic anhydride copolymer waxes and other polymer waxes.

The hot-melt ink which pertains to the present invention should have a ΔE value not exceeding 5, and preferably not exceeding 3. The aforementioned ΔE value is a numerical value arrived at by subjecting a sample prepared by charging the hot-melt ink to an oven heated to 120° C., storing it under heating for 10 days, and then printing, and a sample of hot-melt ink prepared analogously but not stored under heating to measurement using a multi-light source spectrophotometric calorimeter (MSC-5N, manufactured by Suga Shikenki K.K.), measuring with the L*a*b* color system.

The hot-melt ink of the present invention can be prepared by heating and melting the amide resin and other suitable waxes to 70 to 250° C., and preferably 100 to 200° C., stirring and mixing at 200 to 10,000 rpm (preferably 500 to 5000 rpm) using a dissolver or other stirring device, and then filtering the resultant ink composition through a mesh filter or the like.

EXAMPLES

The present invention will be illustrated in further detail below through working examples. The present invention should not be limited to these working examples.

Examples 1 to 5

Comparative Example 1

For the Examples and Comparative Example, amide resins having the properties(Amine value, Acid value given in Table 1, a terpene phenol resin (Clearon P115, manufactured by Yasuhara Chemical Co.), a ketone wax (T-1, manufactured by Kao Corporation), a monoamide wax (NIKKAMIDE SE, manufactured by Nihon Kasei Chemical Co., Ltd.), an antioxidant (IRGANOX 1010 (manufactured by Ciba-Geigy Corporation), and a coloring material (Neopen Yellow 075, manufactured by BASF Co.) were used.

Ink formulation

| components | Parts by weight |
|---|---|
| Amide resin (see table 1) | 20 |
| Clearon P115 | 5 |
| T-1 | 42 |

-continued

Ink formulation

| components | Parts by weight |
|---|---|
| NikkaAmide SE | 30 |
| Irganox 1010 | 1.5 |
| Neopen Yellow 075 | 1.5 |

The composition of the above ink formulation was heated and melted at a temperature of about 100 to 200° C., stirring and mixing thoroughly. It was then filtered through a 2 μm mesh filter using a hot filter apparatus (manufactured by Toyo Roshi Co., Ltd.), yielding a hot-melt ink.

The acid value and amine value of the amide resin were computed using the following methods.

Computation of Acid Value 1 to 2 g of the sample was placed in a 200 cc conical beaker, weighing to an accuracy of 0.0001 g. 50 mL of a neutral mixed solvent (a 7/3 triol/IPA mixed solvent, neutralized with N/10 KOH solution using phenolphthalein as the indicator) was added, and the mixture was heated and dissolved over a water bath.

After cooling to room temperature, titration was conducted with an N/10 KOH methanol solution using phenolphthalein as the indicator, designating the point at which a faint red color persisted for 30 seconds as the end point. The acid value was then computed using the following equation.

$$\text{AMINE VALUE} = (N/10 \text{ KOH}-CH_3OH \text{ sol.}(mL) \times \text{normality} \times f \times 56.1)/\text{sample}(g)$$

In the equation, f is a N/10 KOH methanol solution factor.

Computation of Amine Value 0.5 to 2 g of the sample was placed in a 200 cc conical beaker, weighing to an accuracy of 0.0001 g. 50 mL of a neutral mixed solvent (a 7/3 triol/IPA mixed solvent, neutralized with N/10 KOH solution using phenolphthalein as the indicator) was added, and the mixture was heated and dissolved over a water bath.

After cooling to room temperature, titration was conducted with an N/10 HCl methanol solution (where the amine value of the sample was 30 or above, titration was conducted with an N/2 HCl methanol solution) using bromophenol blue as the indicator, designating the point at which the blue color changed to a yellow color as the end point. The amine value was then computed using the following equation.

$$\text{AMINE VALUE} = (N/10 \text{ HCl}-CH_3OH \text{ sol.}(mL) \times \text{normality} \times f \times 56.1)/\text{sample}(g)$$

In the equation, f is a factor of the N/10 HCl methanol solution.

The resultant hot-melt inks were evaluated for color change using the method described below. Results are given in Table 1.

Color Change Test

The hot-melt ink was charged to an oven heated to 120° C. and stored under heating for 10 days. Samples were then prepared by printing from a printing apparatus provided with a multi-head of the ink-on-demand type, wherein printing is effected by producing droplets through the application of thermal energy to the ink within the print head. An additional batch was prepared by printing a hot-melt ink not stored under heating. The two were subjected to measurement using a multi-light source spectrophotometric colorimeter (MSC-5N, manufactured by Suga Shikenki K.K.), measuring the ΔE value in the L*a*b* color system, where the ΔE value is actually required to be 5 or less.

TABLE 1

|  | Example 1 | Example 2 | Example 3 | Example 4 | Example 5 | Comparative Example 1 |
|---|---|---|---|---|---|---|
| Amine value | 0.51 | 0.7 | 1.3 | 1.3 | 1.4 | 2.4 |
| Acid value | 2.4 | 6.3 | 4 | 4.7 | 2.8 | 4 |
| Color change (ΔE) | 2 | 2.32 | 3.01 | 3.94 | 4.23 | 6.99 |

As apparent from Table 1, the hot-melt inks of Examples 1 to 5 having an amine value of 2 or less exhibit a color change (ΔE) of 5 or less.

On the other hand, the hot-melt ink of Comparative Example 1 having an amine value of 2 or greater exhibits a color change (ΔE) of more than 5.

The hot-melt ink of the present invention has the constitution described above, conferring it with excellent thermal storage properties. Accordingly, it will not undergo color change when used in hot-melt ink-jet recording systems.

The entire disclosure of the specification, claims and summary of Japanese Patent application No. 09-150427 filed on May 23, 1997 is herein incorporated by reference in its entirety.

What is claimed is:

1. A hot-melt ink comprising an amide resin, wherein said amide resin has an amine value of from greater than 0.5 to 1 and an acid value of 2 to 5.

2. The hot-melt ink according to claim 1, wherein said amide resin is a copolymer by copolymerizing a bisamide with a dimer acid.

3. The hot-melt ink according to claim 2, wherein the bisamide is azelamide, sebacamide or phthalamide.

4. The hot-melt ink according to claim 2, wherein the dimer acid is a dicarboxylic acid obtained by thermal polymerization of two unsaturated aliphatic monocarboxylic acid molecules.

5. The hot-melt ink according to claim 4, wherein the dicarboxylic acid is a dimer obtained by dimerization of two-oleic acid molecules, two linoleic acid molecules or two linolenic acid molecules.

6. The hot-melt ink according to claim 1, wherein the range for the amide resin content is 1 to 35 wt % based on the hot-melt ink.

7. The hot-melt ink according to claim 6, wherein the range for the amide resin content is 5 to 30 wt % based on the hot-melt ink.

8. The hot-melt ink of claim 1, further comprising a ketone wax.

9. The hot-melt ink according to claim 8, wherein the ketone wax is at least one of stearones and laurones.

10. The hot-melt ink according to claim 8, wherein the range for the ketone wax content is 1 to 70 wt % based on the hot-melt ink.

11. The hot-melt ink according to claim 10, wherein the range for the ketone wax content is 10 to 60 wt % based on the hot-melt ink.

12. The hot-melt ink of claim 8, further comprising a terpene phenol wax.

13. The hot-melt ink according to claim 12, wherein the range for the terpene phenol resin content is 0.1 to 15 wt % based on the hot-melt ink.

14. The hot-melt ink according to claim 13, wherein the range for the terpene phenol resin content is 0.5 to 10 wt % based on the hot-melt ink.

15. The hot-melt ink of claim 8, further comprising a monoamide wax.

16. The hot-melt ink according to claim 15, wherein said monoamide wax is at least one of lauric acid amide, stearic acid amide, stearyl stearic acid amide, oleic acid amide, erucic acid amide, ricinoleic acid amide, 12-hydroxystearic acid amide and N-substituted fatty acid amides.

17. The hot-melt ink according to claim 15, wherein the range for the monoamide wax content is 0.5 to 40 wt % based on the hot-melt ink.

18. The hot-melt ink according to claim 17, wherein the range for the monoamide wax content is 5 to 30 wt % based on the hot-melt ink.

19. The hot-melt ink of claim 8, further comprising an antioxidant.

20. The hot-melt ink according to claim 19, wherein the range for the antioxidant content is 0.1 to 5 wt % based on the hot-melt ink.

21. The hot-melt ink according to claim 20, wherein the range for the antioxidant content is 0.5 to 3 wt % based on the hot-melt ink.

22. The hot-melt ink of claim 8, further comprising a coloring matter.

23. The hot-melt ink according to claim 22, wherein the range for the coloring matter is 0.1 to 15 wt % based on the hot-melt ink.

24. The hot-melt ink according to claim 23, wherein the range for the coloring matter is 1 to 5 wt % based on the hot-melt ink.

* * * * *